US012683776B2

(12) United States Patent
Stapleton et al.

(10) Patent No.: US 12,683,776 B2
(45) Date of Patent: Jul. 14, 2026

(54) MODIFIED QUANTUM ENTANGLED BIT COMMUNICATION

(71) Applicant: Wells Fargo Bank, N.A., San Francisco, CA (US)

(72) Inventors: Jeff J. Stapleton, O'Fallon, MO (US); Bradford A. Shea, Mint Hill, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 310 days.

(21) Appl. No.: 18/633,156

(22) Filed: Apr. 11, 2024

(65) Prior Publication Data

US 2026/0019246 A1    Jan. 15, 2026

(51) Int. Cl.
H04L 9/08          (2006.01)

(52) U.S. Cl.
CPC .......... H04L 9/0869 (2013.01); H04L 9/0852 (2013.01)

(58) Field of Classification Search
CPC ............................ H04L 9/0869; H04L 9/0852
See application file for complete search history.

(56) References Cited

U.S. PATENT DOCUMENTS

| | | | | |
|---|---|---|---|---|
| 12,015,705 B1 * | 6/2024 | Castrillo | ................... | G06F 7/58 |
| 2023/0004661 A1 * | 1/2023 | Choi | ..................... | G06F 21/602 |

OTHER PUBLICATIONS

Basset, F Basso, "Entanglement Swapping with Photons Generated on Demand by a Quantum Dot", Physical Review Letters 123, (2019), 6 pgs.

Brambila, Emma, "Ultrabright polarization-entangled photon pair source for frequency-multiplexed quantum communication in free-space", Optics Express vol. 31, No. 10, (May 8, 2023), 11 pgs.
Chen, Si, "Heralded Three-Photon Entanglement from a Single-Photon Source on a Photonic Chip", Cornell University Quantum Physics arXiv:2307.02189, (Jul. 5, 2023), 5 pgs.
Collins, Daniel, "Quantum Relays for Long Distance Quantum Cryptography", J. Mod. Opt. 52, 735 (2005), (Nov. 14, 2003), 14 pgs.
Dai, Wenhan, "Entanglement Swapping in Quantum Switches: Protocol Design and Stability Analysis", quant-ph arXiv:2110.04116v2, (May 22, 2023), 45 pgs.
Lu, Chao-Yang, "Quantum-dot single-photon sources for the quantum internet", Nature Nanotechnology vol. 16 Dec. 2021 1294-1296, (Dec. 2021), 7 pgs.
Pan, Jian-Wei, "Multi-photon entanglement and interferometry", Rev. Mod. Phys. on Sep. 20, 2011, (Sep. 26, 2011), 71 pgs.
Wang, Hui, "High-efficiency multi-photon boson sampling", Nature Photonics vol. 11, pp. 361-365, (2017), 16 pgs.
Wang, Hui, "High-efficiency multi-photon boson sampling", Supplementary Information, (2017), 18 pgs.

* cited by examiner

*Primary Examiner* — Hee K Song
(74) *Attorney, Agent, or Firm* — SCHWEGMAN LUNDBERG & WOESSNER, P.A.

(57) ABSTRACT

Systems and techniques may generally be used for modifying quantum entangled bit communication. An example technique may include generating, at a first node in a computing network, a random number using a quantum derived seed as input to a random number generator; modifying a program using the random number while maintaining a function output of the program for a given input; receiving, at the first node from a second node, an input based on the random number; and executing the modified program at the first node using the input to obtain an output consistent with the program in an unmodified state.

20 Claims, 9 Drawing Sheets

300

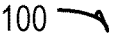
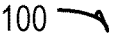
ENTANGLED PARTICLE
SOURCE 110
112 — LASER
114 — ENTANGLED
PHOTON SOURCE
116   118
NODE A 120   NODE B 140
130   150
PBS
CUBE
134   132   152   154
PBS
CUBE
0   0
136   156
138   158
1   1
POLARIZATION
ROTATOR
125   122   142   145
170
FIG. 1

DATA TABLE 200

| PHOTON PAIR | NODE 1 | NODE 2 | NODE 1 | NODE 2 |
|---|---|---|---|---|
| 1 | X | Z | 1 | 1 |
| 2 | W | V | 1 | 1 |
| 3 | X | Z | 0 | 1 |
| 4 | W | W | 0 | 0 |
| 5 | Z | V | 0 | 1 |
| 6 | Z | Z | 0 | 0 |
| 7 | W | Z | 0 | 1 |
| 8 | X | V | 0 | 0 |
| 9 | Z | V | 0 | 1 |
| 10 | Z | Z | 1 | 1 |
| 11 | X | W | 1 | 0 |
| 12 | X | Z | 1 | 1 |
| 13 | W | V | 1 | 0 |
| 14 | W | V | 0 | 0 |
| 15 | Z | W | 0 | 0 |

DATA SET 220

| PHOTON PAIR NUMBER | A1, A2 | EXPECTATION VALUE OF A1,A2 |
|---|---|---|
| 1 | XZ | 0 |
| 2 | WV | 0 |
| 3 | XZ | 0 |
| 5 | ZV | $-1/\sqrt{2}$ |
| 7 | WZ | $-1/\sqrt{2}$ |
| 8 | XV | $+1/\sqrt{2}$ |
| 9 | ZV | $-1/\sqrt{2}$ |
| 11 | XW | $-1/\sqrt{2}$ |
| 12 | XZ | 0 |
| 13 | WZ | $-1/\sqrt{2}$ |
| 14 | WV | 0 |
| 15 | ZW | $-1/\sqrt{2}$ |

DATA SET 210

| PHOTON PAIR | NODE 1 | NODE 1 | NODE 2 | NODE 2 |
|---|---|---|---|---|
| 4 | W | 0 | W | 1 |
| 6 | Z | 0 | Z | 0 |
| 10 | Z | 1 | Z | 0 |

FIG. 2

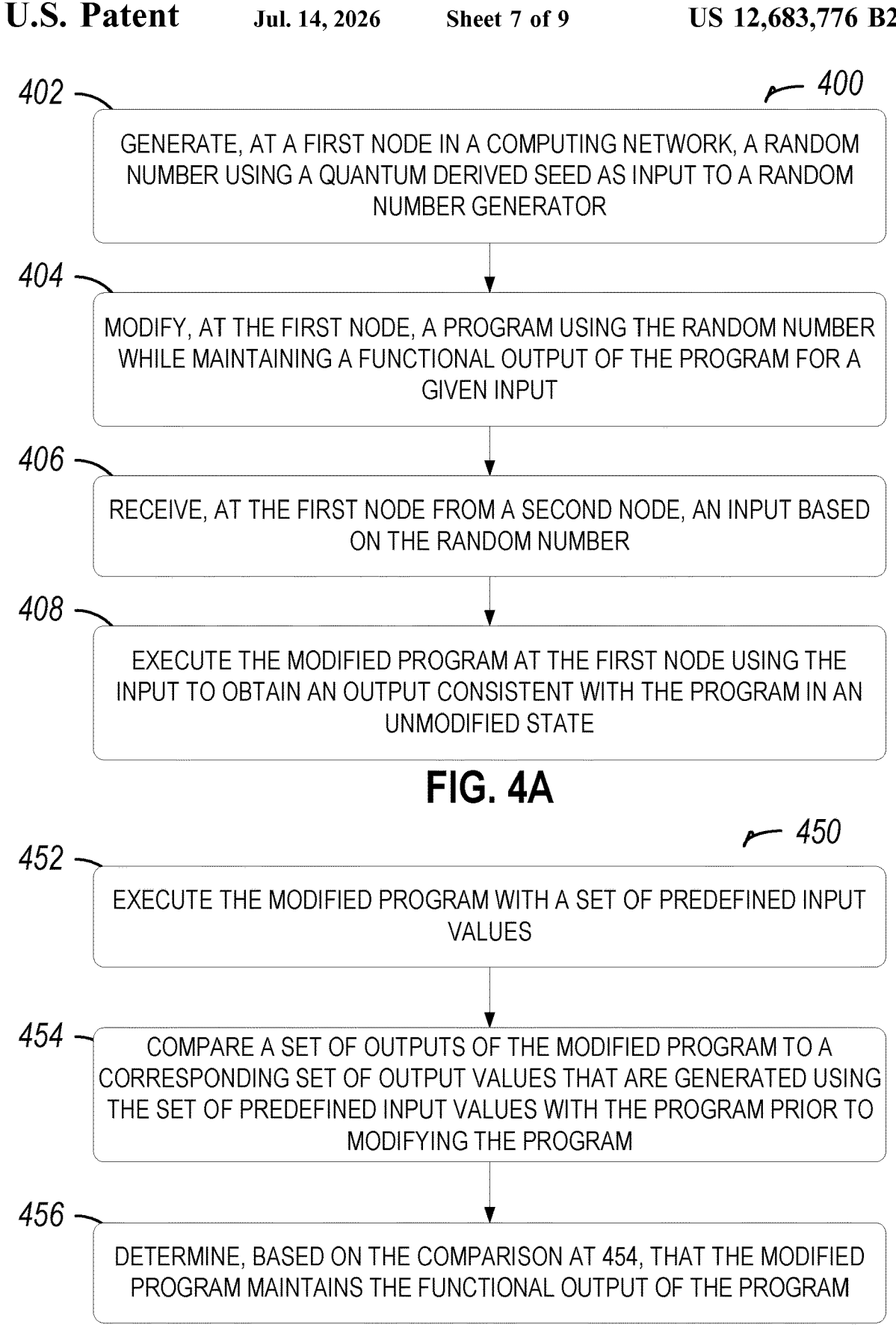

402

GENERATE, AT A FIRST NODE IN A COMPUTING NETWORK, A RANDOM NUMBER USING A QUANTUM DERIVED SEED AS INPUT TO A RANDOM NUMBER GENERATOR

404

MODIFY, AT THE FIRST NODE, A PROGRAM USING THE RANDOM NUMBER WHILE MAINTAINING A FUNCTIONAL OUTPUT OF THE PROGRAM FOR A GIVEN INPUT

406

RECEIVE, AT THE FIRST NODE FROM A SECOND NODE, AN INPUT BASED ON THE RANDOM NUMBER

408

EXECUTE THE MODIFIED PROGRAM AT THE FIRST NODE USING THE INPUT TO OBTAIN AN OUTPUT CONSISTENT WITH THE PROGRAM IN AN UNMODIFIED STATE

EXECUTE THE MODIFIED PROGRAM WITH A SET OF PREDEFINED INPUT VALUES

454

COMPARE A SET OF OUTPUTS OF THE MODIFIED PROGRAM TO A CORRESPONDING SET OF OUTPUT VALUES THAT ARE GENERATED USING THE SET OF PREDEFINED INPUT VALUES WITH THE PROGRAM PRIOR TO MODIFYING THE PROGRAM

456

DETERMINE, BASED ON THE COMPARISON AT 454, THAT THE MODIFIED PROGRAM MAINTAINS THE FUNCTIONAL OUTPUT OF THE PROGRAM

FIG. 4B

MODIFIED QUANTUM ENTANGLED BIT COMMUNICATION

BACKGROUND

Quantum entanglement is a phenomenon where two or more particles become linked in such a way that the state of one particle instantaneously influences the state of the other, regardless of the distance separating them. When a measurement is made on one entangled particle, the measurement result can predict the outcome of a similar measurement on the other particle. Entanglement is utilized in quantum cryptography applications, often as a source of random numbers.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1 illustrates an example device to distribute a pair of entangled photons to a first node and a second node in a computing network in accordance with some examples.

FIG. 2 illustrates an example dataset that is produced by measurements of an example device in accordance with some examples.

FIG. 4A illustrates a flowchart showing a technique for modified quantum entangled bit communication in accordance with some examples.

FIG. 4B illustrates a flowchart showing a technique for use in verifying a modified program that is used in modified quantum entangled bit communication in accordance with some examples.

DETAILED DESCRIPTION

Figure 3A:
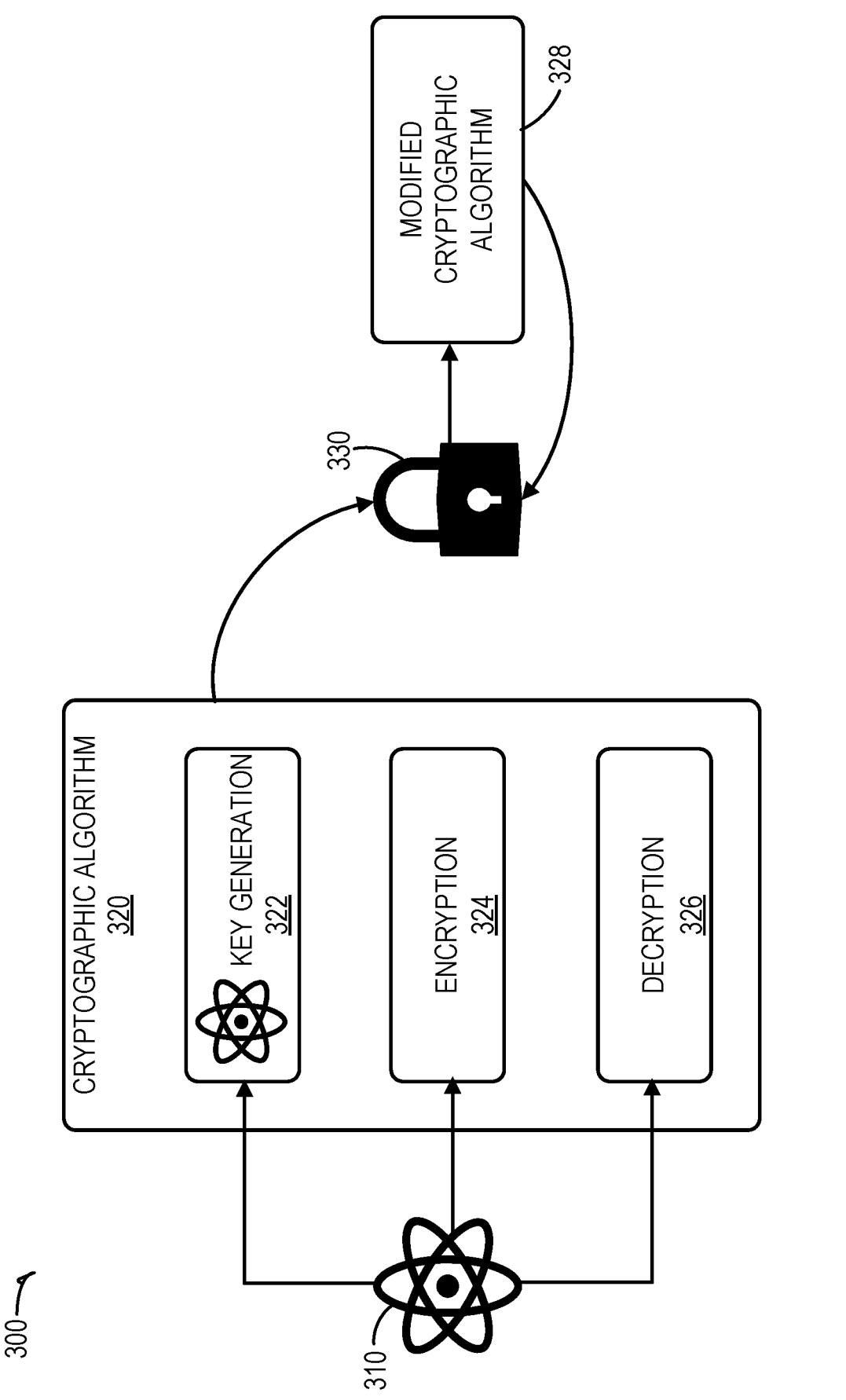
FIG. 3A illustrates modification of a cryptographic algorithm in accordance with some examples.

In cryptographic systems, the generation of strong asymmetric public/private key pairs is critical for secured communications, especially in financial transactions. Public key infrastructure (PKI) underpins various security protocols, such as TLS, IPsec, etc., ensuring the confidentiality and integrity of data exchanged over potentially insecure networks. However, traditional key generation methods face challenges because the keys may be based on numbers that are not as random as they may appear. Increasing computational power and the emergence of quantum computing could render current asymmetric algorithms vulnerable to attacks.

Additionally, the secure distribution and management of keys remain challenging, as any compromise in the key exchange process can lead to key compromise, counterfeit identities, unauthorized access, and data breaches. Protecting against current and future threats for maintaining the security of digital communications requires solutions that address such challenges. Thus, there is a need for quantum-resistant cryptographic techniques.

In some examples, quantum entanglement can provide to a first node and a second node in a computing network the same random number. For example, by entangling photons at a common photon source and sending one photon stream to the first node, and the other photon stream to the second node, a measurement at both nodes of the received photon streams can generate a string of binary values which can be used as a random number. Any eavesdropping of either photon streams is detectable. This random number can be used to modify a program, through changes in the encryption/decryption processes, through dynamically executing conditional code, by directly changing parameters within the program code, by changing how data within a program is stored, as a few examples.

When a random number is used to alter an executable program, the modified program can be more secure as the modification can increase the program complexity and prevent reverse-engineering of the program. By including a random number generated from a quantum derived seed, and particularly by distributing the quantum derived seed using quantum entanglement, such modifications can be communicated across two or more nodes of a computing network.

FIG. 1 illustrates an example device 100 to distribute a stream of entangled particles to a first node and a second node in a computing network in accordance with some examples. The device 100 may include an entangled particle source 110, a first node (Node A) 120 and a second node (Node B) 140. In some examples, the device 100 may be configured as an implementation of a specific quantum cryptography protocol, such as the Ekert protocol (E91). The use of quantum entanglement to deliver correlated photon streams to two measurement entities is leveraged in quantum key distribution. Additionally, the measurement results at Node A 120 and Node B 140 can provide a seed for generating random numbers at the end stations where the measurements occur. In this way, a second property of quantum mechanics can be applied in the device 100. That is, by using the randomness inherent when generating subsequent pairs of entangled particles, the quantum entangled particles can be a seed for generating random numbers at Node A 120 and Node B 140 after the distribution of quantum entangled particles. Random numbers derived from a quantum seed are often used as 'keys' in cryptographic algorithms, and may be used for any suitable purposes, as detailed below in FIGS. 3A through 3D and FIGS. 4A-4B.

The Ekert protocol for quantum key distribution utilizes a pair of quantum entangled particles in a so-called "Bell state". A first particle of the pair is delivered to a measurement station within Node A 120 and a second particle of the pair is delivered to a measurement station within Node B 140. In particular for the Ekert protocol, the measurement station at Node A 120 uses analyzers that may be oriented in one of three directions, and for each particle that arrives, the measurement station at Node A 120 measures the orientation of the quantum particle with the analyzer randomly chosen in one of the three directions. The measurement station at Node B 140 has an analyzer that may be oriented in three directions, with two of the three orientations of the analyzer used at measurement station B being the same as those used at measurement station A. The measurement station at Node B 140 performs a corresponding measurement with the quantum particle delivered to Node B 140, where the analyzer also may randomly choose an orientation from one of the three pre-set orientations.

After measurement stations at Node A 120 and Node B 140 each receive a given number of entangled particles, and perform the corresponding number of measurements, the two measurement stations communicate on a public channel. Communication between the two measurement stations exchanges the following information: what the orientation was for each analyzer at each measurement, and what the result of the measurement was at each station.

The analysis of the combined results proceeds as follows. Measurements where the analyzers at the measurement station at Node A 120 are set to a different orientation than those at the measurement station at Node B 140 are sorted into a "security check" data set. Measurements where the analyzers at the measurement station at Node A 120 are set to the same orientation as those at the measurement station at Node B 140 are sorted into a "key generation" data set.

The results of measurements in the "security check" data set are evaluated against an inequality such as Bell's inequality or the Clauser-Horne-Shimony-Hold (CHSH) inequality. When the CHSH inequality is evaluated and found to be violated, then the key generation data set may be used with confidence that no outsider observers had interfered with the quantum communication channel (such as by listening in on the quantum communication channel). When the measurements in the "security check" data set do not violate the CHSH (or other suitable) inequality, then the quantum communication channel may have been disturbed by an outside observer, and the key generation data set may be insecure and discarded.

When the "security check" data set passes a test of an inequality such as the CHSH inequality, the results of measurements in the "key generation" data set are perfectly anti-correlated. That is, a binary measurement of a +1 value at measurement station A will occur with an opposing binary measurement value (e.g., 0, −1, etc.) measured at measurement station B.

Thus, each measurement station may be in possession of the same secret key where each measurement provides a bit value in a random number. In order to have exactly matching secret keys, one of the measurement stations may perform any necessary addition/subtraction/modulo manipulation of a measurement value in order to invert the binary measurement values, e.g., transform each ±1 to a ∓1, or 0 to a +1, etc., depending on how the results of the measurements are digitized, stored, or otherwise used in later processes.

In some examples, the device 100 may include any other suitable configurations, such as the entangled particle source 110 and Node A 120 being co-located, such as in the BB84 quantum cryptography protocol. The device 100 may include any suitable additional devices or devices to generate quantum entangled particles, perform measurements on quantum entangled particles, or otherwise implement a cryptography protocol that distributes quantum entangled particles and that generates random numbers from a quantum derived seed at a first node and at a second node.

The entangled particle source 110 may produce entangled photon pairs and may include a laser 112 and an entangled photon source 114. In some examples, the laser 112 may be any suitable laser, such as a continuous wave laser or a pulsed laser. The laser 112 may have any suitable wavelength (tunable or fixed), bandwidth, output power. The laser 112 may be a fiber laser, a diode laser, a Ti-sapphire laser (or have any other suitable crystal as the lasing medium), a dye laser, a laser with an elemental gas (e.g., He, Ne, Ar, Kr) as the lasing medium, etc. The laser 112 may have any suitable coherence length and may be selected to have certain output features (center wavelength, bandwidth, pulse length, coherence length, etc.) that are required for an implementation of the entangled photon source 114 to produce a suitable pair of entangled photons 116 and 118.

In some examples, the entangled photon source 114 may be any suitable physical device that outputs the pair of entangled photons 116 and 118. Photons output by the entangled photon source 114 may be entangled across any suitable physical characteristic, such as phase, polarization, wavelength, arrival time, etc. The output photon pair (the entangled photons 116 and 118) may be described (e.g., using a mathematical representation such as bra-ket notation of the quantum state) with any suitable quantum entangled state, such as a Bell state, a "cat" state, a squeezed state, or any other suitably described quantum mechanical superposition that may be necessary to carry out a selected quantum cryptography protocol.

In some examples, entangled photons produced from spontaneous parametric down conversion (SPDC) in any suitable non-linear material (e.g., BBO, lithium niobate) may be used as the entangled photon source 114. Entangled photons produced from radiative cascade of atomic transitions (such as found in atomic calcium, atomic rubidium, etc.) may be used as the entangled photon source 114. Entangled photons produced from radiative transitions in artificial two-level systems (such as a bi-exciton cascade in InAs strained quantum dots) may be used as the entangled photon source 114. Entangled photons may be produced by any suitable device to be used as the entangled photon source 114. Although not shown in FIG. 1, any additional hardware such as vapor cells, heaters, ion traps, pumps, alignment mirrors, electro-magnets, acousto-modulators, cryogenic refrigerators, additional lasers, light sources, detectors, or the like, may be included in the entangled particle source 110 to facilitate the operation of the entangled photon source 114 or the preparation of output entangled photons in a desired quantum state (e.g., a Bell state).

In some examples, the entangled photon source 114 may produce the entangled photons 116 and 118 that are coupled into transmission fibers for delivery to Node A 120 and Node B 140. In some examples, the entangled photon source 114 may produce the entangled photons 116 and 118 that are delivered through free-space propagation to Node A 120 and Node B 140.

Note that the entangled photon source 114 may be replaced with any suitable device that produces pairs of entangled particles other than the entangled photons 116 and 118. For example, the entangled particles may be pairs of ions (e.g., trapped ions, ion beams), pairs of electrons, pairs of qubits (e.g., superconducting qubits, solid state qubits) that are stationary and may be entangled or whose entanglement may be transported through any suitable device, etc.

In another example, the entangled photon source 114 may instead be (or in addition be used with or include) a source of entangled electrons. In this example, each of the measurement devices 130 and 150 may include a wire grid polarizer that is sensitive to (e.g., transmits, absorbs, rotates, etc.) a particular spin orientation of incoming electrons, and may include a particle detector.

Node A 120 may include a measurement device 130 and processor 125 and may have one photon 116 of an entangled pair delivered to measurement device 130 from the entangled photon source 114. Node B 140 may include a measurement device 150 and processor 145 may have one photon 118 of an entangled pair delivered to measurement device 150 from the entangled photon source 114.

Measurement device 130 and measurement device 150 may include substantially similar components. Measurement device 130 may include a polarization rotator 132, a mirror, a polarizing beam splitter (PBS) 134, a detector 136 at the transmission port of the PBS ("0"), and a detector 138 at the reflection port of the PBS ("1"). Measurement device 150 may include a polarization rotator 152, a mirror, a polarizing beam splitter (PBS) 154, a detector 156 at the transmission port of the PBS ("0"), and a detector 158 at the reflection port of the PBS ("1"). Processors 125 and 145 may have a communication channel 170.

As shown in FIG. 1, a photon pair including entangled photons 116 and 118 emitted from the entangled photon source 114 is transmitted (e.g., free-space, fiber optic, etc.) to two nodes. Specifically, one photon 116 is transmitted to Node A 120 and the other photon 118 in the entangled photon pair is transmitted to Node B 140. In the example of FIG. 1, the entangled photons 116 and 118 are entangled through the polarization of each photon, thus the measurement devices 130 and 150 at each node are configured to measure polarization.

In the E91 protocol, a polarization rotator at each measurement device rotates the photon polarization by a certain amount. Polarization rotators may be implemented for photons using a prism, a Faraday rotator, or a bi-refringent waveplate (e.g., half-wave, quarter-wave, etc.) that is a fixed crystal, a liquid crystal, a ferroelectric crystal, or a magneto-optic crystal. In some examples, each measurement device 130 and 150 has a polarization rotator of the same implementation (e.g., both use a bi-refringent liquid crystal waveplate). When implementing the E91 cryptography protocol, measurement device 130 may use a first set of three angles to rotate the polarization of incoming photons. As a particular example, the polarization rotator 132 may be configured to alternate (e.g., randomly) between angles $\{x, w, z\}=\{0, \pi/8, \pi/4\}$ and measurement device 150 may use a second set of three angles to rotate the polarization of incoming photons. As a particular example, the polarization rotator 152 may use a second set of three angles where the first two angles are shared with the polarization rotator 132, such as, $\{w, z, v\}=\{\pi/8, \pi/4, 3\pi/8\}$.

At measurement device 130, after the photon exits the polarization rotator 132, the photon is sent to PBS 134. In the example of FIG. 1, the PBS 134 is shown as a cube, however, PBS 134 may be implemented using any suitable bulk optic or photonic device that may direct photons of orthogonal polarization to two separate output channels. In FIG. 1, if the incoming photon is 'vertically' polarized, it may propagate through the transmission channel of PBS 134. If the incoming photon is 'horizontally' polarized, it may propagate through the reflection channel of PBS 134. If the photon is linearly polarized on a basis other than 'horizontal' or 'vertical', then the photon has a probability (based on the exact rotation angle relative to the PBS polarization basis) to propagate through either the transmission channel or the reflection channel.

When a photon in measurement device 130 propagates through the transmission channel of PBS 134, a detector 136 may register the photon. A data acquisition program (e.g., running on processor 125) may record the registration of a photon at detector 136 with any suitable quantifying value, such as "0", "–1", etc. When a photon in measurement device 130 propagates through the reflection channel of PBS 134, a detector 138 may register the photon. In some examples, the data acquisition program (e.g., running on processor 125) may record the registration of a photon at detector 138 with any suitable orthogonal quantifying value, such as "1". Detectors 136 and 138 may be approximately identical detectors, and may be any suitable opto-electronic device that is sensitive to single photons. For example, detectors 136 and 138 may be avalanche photodiodes, superconducting nanowire detectors, etc. Detectors 136 and 138 may be in communication with processor 125 through communication channel 122.

At measurement device 150, after the photon exits the polarization rotator 152, the photon is sent to PBS 154. In the example of FIG. 1, the PBS 154 is shown as a cube, however, PBS 154 may be implemented using any suitable bulk optic or photonic device that may direct photons of orthogonal polarization to two separate output channels. In FIG. 1, if the incoming photon is 'vertically' polarized, it may propagate through the transmission channel of PBS 154. If the incoming photon is 'horizontally' polarized, it may propagate through the reflection channel of PBS 154. If the photon is linearly polarized on a basis other than 'horizontal' or 'vertical', then the photon has a probability (based on the exact rotation angle relative to the PBS polarization basis) to propagate through either the transmission channel or the reflection channel.

When a photon in measurement device 150 propagates through the transmission channel of PBS 154, a detector 156 may register the photon. A data acquisition program (e.g., running on processor 145) may record the registration of a photon at detector 156 with any suitable quantifying value, such as "0", "–1", etc. When a photon in measurement device 150 propagates through the reflection channel of PBS 154, a detector 158 may register the photon. In some examples, the data acquisition program (e.g., running on processor 145) may record the registration of a photon at detector 158 with any suitable orthogonal quantifying value, such as "1". Detectors 156 and 158 may be approximately identical detectors, and may be any suitable opto-electronic device that is sensitive to single photons. For example, detectors 156 and 158 may be avalanche photodiodes, superconducting nanowire detectors, etc. Detectors 156 and 158 may be in communication with processor 145 through communication channel 142.

Note that, as shown in FIG. 1, processors 125 and 145 may also be in communication with each other, as shown by communication channel 170, which may be any suitable wired or wireless communication channel. In some examples, results of the measurements at measurement device 130 and measurement device 150, as well as additional analysis to check for disruptions to the quantum entangled photon pairs (e.g., through a measurement of one of the photons prior to measurements at measurement devices 130 and 150) may be communicated. In some examples, a portion of the measurements recorded at measurement devices 130 and 150 may be used as random numbers.

In some examples, Node A 120 and Node B 140 can be located at any suitable distance apart from each other. For example, Node A 120 may be located at a data center and Node B 140 may be located at a corporate office in a metropolis. Additionally, portions of Node A 120, such as measurement device 130 and processor 125, may be distributed at multiple locations and may be in communication with each other through any suitable wired or wireless communication. Similarly, portions of Node B 140, such as measurement device 150 and processor 145, may be distributed at multiple locations, or at multiple workstations within a single location.

In another example, at least one of Node A 120 and Node B 140 may be located on an artificial satellite, while the other node may be located at a terrestrial station in communication with the artificial satellite.

In some examples, executable code and data can be securely transmitted between terrestrial nodes and satellites using the device 100 and other aspects of the disclosed subject matter. By leveraging quantum entanglement and quantum cryptography techniques, algorithms may be updated on satellites, ensuring that any modifications to the code remain unpredictable and resistant to reverse engineering. This approach addresses the need for heightened security in satellite communications, which is crucial given the increasing reliance on satellites for a wide range of applications, including financial transactions and data transmission.

FIG. 2 illustrates an example dataset that is produced by measurements of an example device in accordance with some examples. The data table 200 shown in FIG. 2 may correspond to the results of fifteen sequential measurements made using an entangled particle source, such as described above in FIG. 1. Data table 200 may include results from measurements at two nodes of a computing network, where the measurements correspond to measuring the quantum state of entangled particles transmitted to the two nodes. As shown in FIG. 2, data table 200 includes the recorded outputs of photon detection events as described above. Additionally, data table 200 includes a record of which angles were used by each measurement device for each measurement iteration. The exact measurement angles may be any suitable measurement angles, with the representative {x, w, z, v} angles shown in data table 200.

In some examples, a secure random number may be extracted from data table 200 by first separating the data into two datasets, where the first dataset 210 includes measurements where measurement device 130 and measurement device 150 used the same angles in the polarization rotators 132 and 152 (respectively). The second dataset 220 contains remaining measurements, where measurement device 130 and measurement device 150 used different angles in the polarization rotators 132 and 152 (respectively). In this example, the measurements that generate data table 200, and in particular the first dataset 210, may be considered a quantum derived seed for generating a random number.

As shown in FIG. 2, the first dataset 210 may contain results of the fourth, sixth, and tenth measurements performed. Correspondingly, the remaining results are shown in the second dataset 220.

The second dataset 220 may be used to check the security of the measurements by calculating an inequality such as the CHSH inequality. Each pair of angles used in measurement device 130 and 150 may have a corresponding expectation value. The sum S of the expectation values for all the measurements in the second dataset 220 may provide a value for comparison to the CHSH inequality. For example, if the sum S=−212, then the quantum entanglement of the photon pairs was preserved for all fifteen measurements found in data table 200. When the CHSH inequality indicates quantum entanglement was preserved, then the measurements in the first dataset 210 may be anti-correlated. That is, whenever a "0" was recorded at measurement device 130, a "1" was recorded at measurement device 150, and vice versa.

Node A 120 and Node B 140 may thus each have a copy of the same random number generated from a quantum derived seed which may be used for any suitable cryptographic or other computing processes.

FIG. 3A illustrates modification of a cryptographic algorithm using a random number generated from a quantum derived seed in accordance with some examples. As shown, block diagram 300 includes a random number 310, a cryptographic algorithm 320, a verification component 330, and a modified cryptographic algorithm 328.

In some examples, the random number 310 may be generated using any suitable quantum derived seed as input to a random number generator. In some examples, a quantum derived seed as input to a random number generator may exist at a first node and a second node, as described above with reference to FIGS. 1 and 2. The random number 310 generated from the quantum derived seed may be used in any sub-process of cryptographic algorithm 320, such as key generation 322, encryption 324, or decryption 326.

In some examples, key generation 322 may be performed using the random number 310. The random number itself may be the key, particularly in examples where a symmetric-key algorithm is used. In some examples, the random number may be used to generate the key for a symmetric-key algorithm such as Advanced Encryption Standard (AES), data encryption standard (DES), block ciphers, etc.

The random number 310 may be used in the encryption process(es) 324 of the cryptographic algorithm. For example, the AES encryption process generally includes byte substitution, row shifting, column mixing, and adding a round key. In some examples, the random number 310 may be used to randomly select the offset value for row shifting. In some examples, the random number 310 may be used to select or generate a polynomial used in column mixing. In some examples, the random number 310 may be used to derive the round key from the original key through any suitable key expansion process. In each of these examples, the AES decryption process may use the same random number 310 as appropriate to perform a computationally correct inverse of the byte substitution, row shifting, column mixing, and adding the round key. Such an example may be particularly effective when the encryption process is performed at a first node and the decryption process is performed at a second node, and both of the first and the second node have access to the same quantum derived seed that is input to generate the random number 310, as described above in FIG. 1.

In another example, the key used in the encryption process (such as AES or any other suitable encryption process) may be modified. For example, the random number 310 may be combined in any suitable combination with an AES key to create a modified AES key. As a particular example, a byte-wise operation to XOR the AES key with the random number 310 can create a new random number that may be used as the modified AES key. Similarly, an AES key may be combined with the random number 310 such that the random number 310 is a tweak key in an encryption protocol, such as the XTS mode of using AES (NIST SP 800-38E) or the Format Preserving Encryption (FPE) algorithm.

Note that, when the cryptographic algorithm 320 is modified by the random number 310, verification component 330 can perform any suitable routines or processes to determine whether the functional output of the cryptographic algorithm remains the same as the unmodified version. As noted by the input arrow to verification component 330, the output of the cryptographic algorithm can be used as input to verification component 330. As indicated by the output arrow, verification component 330 can create feedback to the cryptographic algorithm 320 in the event that using the random number 310 does not preserve the functional output.

Figure 3B:
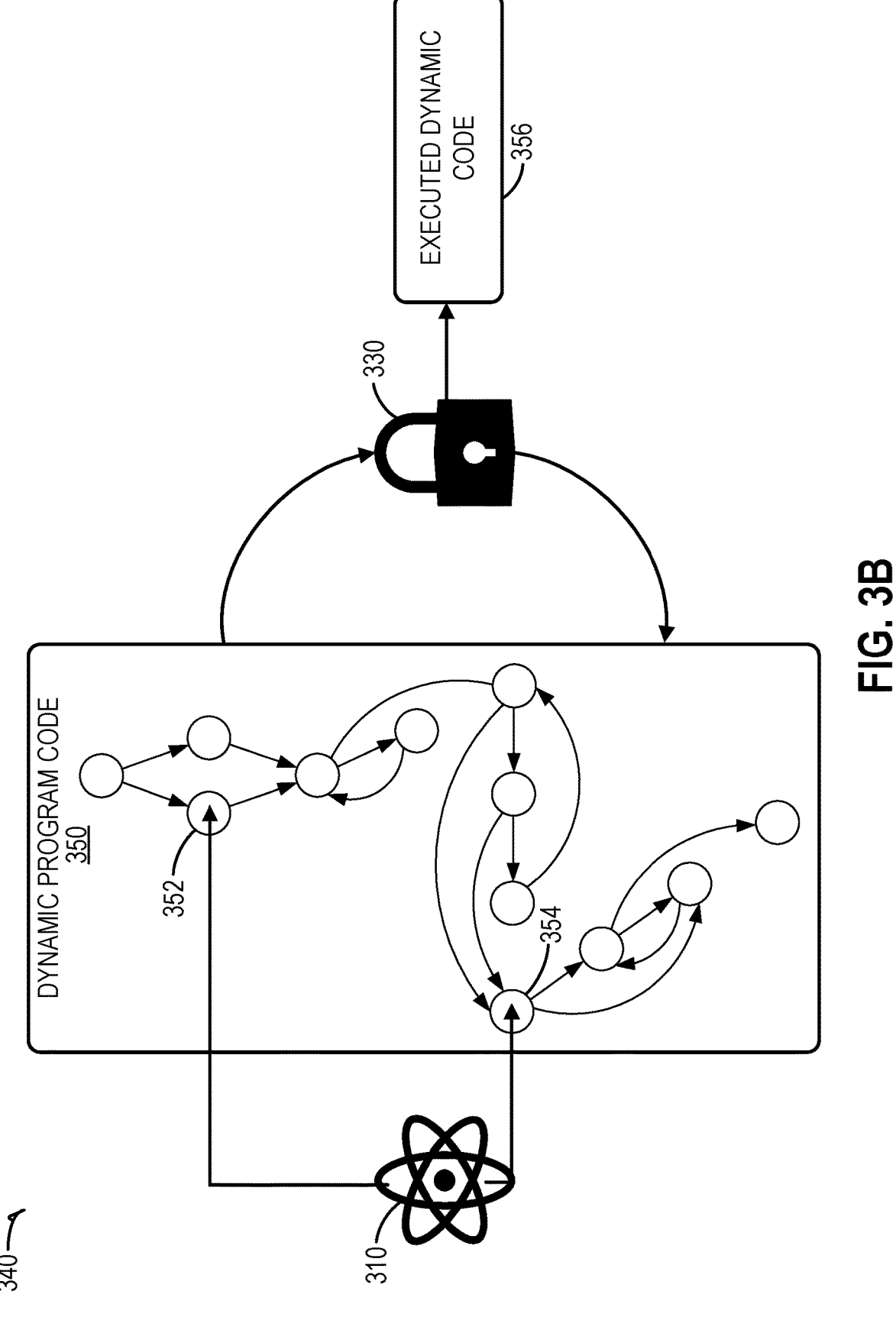
FIG. 3B illustrates modification of control flow within a program in accordance with some examples.

FIG. 3B illustrates modification of control flow within a program using a random number generated from a quantum derived seed in accordance with some examples. As shown, block diagram 340 includes the random number 310, dynamic program code 350, verification component 330, and the executed dynamic code 356.

Dynamic program code 350 contains a representation of control flow as nodes connected by arrows. Such control flow may include loops (e.g., for loops, while loops, do-while loops, etc.) and conditional statements (if/then, if/else, etc.). Dynamic program code 350 may also contain conditional statements to allow for decision making, may create multiple branches of logic, and may create complex decision trees when conditional statements are nested. In some examples, a branching control flow may include different implementations of a subroutine that are functionally equivalent, and the random numbers may be used to select between the functionally equivalent but structurally different implementations.

In some examples, executing different branches of dynamic program code 350 may produce functionally equivalent outputs, as can be verified by the verification component 330. In particular, verification component 330 can verify (or identify a subset of all possible branches) that different branches perform equivalent operations when operated in a different sequence or using different algorithms.

As shown in FIG. 3B, at a node such as node 352, the random number 310 may be used as part of the decision making occurring at node 352. Thus, the random number 310 contributes to dynamic code execution of the dynamic program code 350. In some examples, the random number 310 may be used to shuffle the order of independent operations within a function, such that the logical outcome of the function remains unchanged, but the execution order varies. In some examples, a first random number may be used at node 352 and a second random number may be used at node 354.

In some examples, the random number 310 can be used in any suitable operation at a node in the execution of the dynamic program code 350. For example, node 354 may require a random number to include with a message at the output (e.g., a message authentication code, MAC). In an execution of the dynamic program code 350, the valid output can have a valid MAC. In this example, the random number 310 can be a key for the MAC.

Figure 3C:
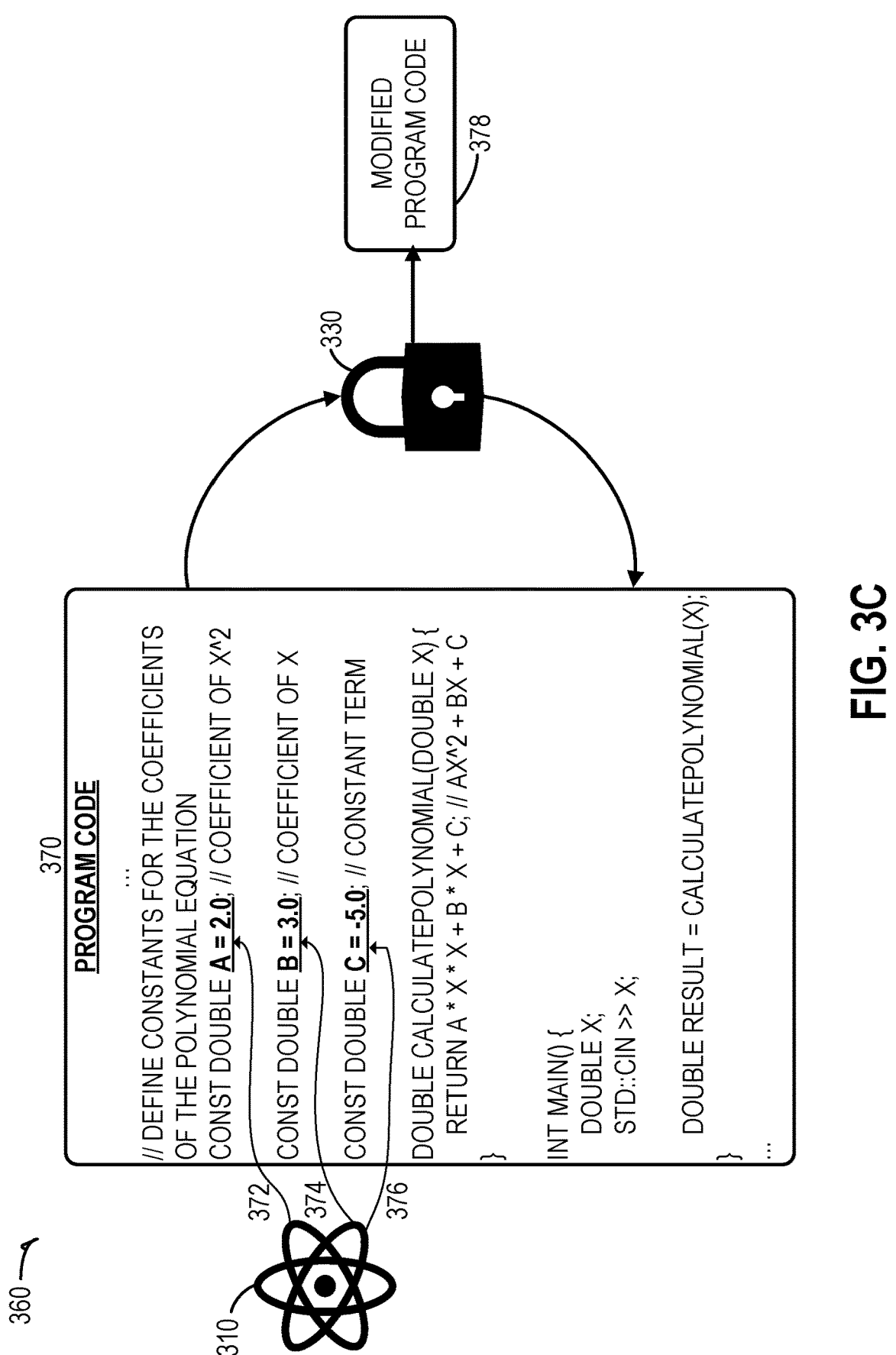
FIG. 3C illustrates modification of a constant value used when executing a program in accordance with some examples.

FIG. 3C illustrates modification of a constant value used when executing a program using a random number generated from a quantum derived seed in accordance with some examples. As shown, block diagram 360 includes the random number 310, program code 370, verification component 330, and modified program code 356.

In some examples, program code 370 can include a function that uses a constant value. As shown in FIG. 3C, a polynomial function is defined in program code 370 with constants A, B, and C. In some examples, the random number 310 can be used as at least one of the constants A, B, or C, as shown by arrows 372, 374, and 376, respectively. For example, the program code 370 can be written such that an unmodified quadratic polynomial has coefficients {A, B, C}={2.0, 3.0, −5.0}. A mathematical representation of the polynomial is shown in Equation (1).

$$y = 2.0x^2 + 3.0x - 5.0. \qquad \text{Equation (1)}$$

As a first modification to the program code 370, the random number 310 can be {R}={14} and can be received by program code 370. Additionally, a second random number can be used to select which of the coefficients of Equation (1) to replace, and in some examples, the coefficient of the quadratic term (A=2.0) can be selected. Then, program code 370 can replace A=2.0 with A'=14, where the polynomial is mathematically represented as shown in Equation (2).

$$y = 14.0x^2 + 3.0x - 5.0. \qquad \text{Equation (2)}$$

In some examples, verification component 330 can perform any suitable calculations involving the segment of modified program code. For example, verification component 330 can calculate the polynomial function with at least one of the constants A, B, or C replaced with a random number. Verification component 330 can use a set of control inputs, e.g., x=[1.0, 2.0, 3.0] to the polynomial function, and can compare the outputs of the modified polynomial function to the outputs prior to the replacement of at least one of the constants A, B, or C.

Using the example shown in Equation (1), verification component can compute the outputs y=[0.0, 9.0, 22.0] for inputs of x=[1.0, 2.0, 3.0].

To verify the functional output of Equation (2), verification module can scale the coefficients B→B' and C→C' by the same amount as A→A' by finding a value d such that A'=d*A. In the example above, A'=14=7*2=7*A.

That is, as shown in Equation 3a, 3b, and 3c:

$$A' = 14.0 = 7 * A, \qquad \text{Equation (3a)}$$

$$B' = 7 * B = 7 * 3 = 21, \qquad \text{Equation (3b)}$$

$$C' = 7 * C = 7 * -5 = -35. \qquad \text{Equation (3c)}$$

Verification component 330 can then compute the results of Equation 4 using the control inputs, that is, x=[1.0, 2.0, 3.0], where $$y' = A'x^2 + B'x + C' = 14.0x^2 + 21x - 35. \qquad \text{Equation (4)}$$

That is, y'=[0.0, 63.0, 154.0]

Lastly, verification component 330 can determine that y'=7*y, that is, the outputs of Equation (4) with the control inputs are a scaled version of the outputs of Equation (1). The functional output of the polynomial shown in Equation (4) can be described in relation to Equation (1), thus the functional output of program code 370 is preserved. In some examples, verification component 330 can modify the program code 370 to include the examples, modifications, scaling, or any other description of a polynomial that has had a modification to at least one of the constants in the polynomial.

Note that, the verification example above replaced one constant (A) in a second-order polynomial. Any suitable quantity of constants can be replaced, and in some examples, even the order of the polynomial may be altered by a random substitution (e.g., one or more random numbers input to the program code 370). Additionally, note that although program code 370 uses a polynomial f(x) that includes terms up to a second-order, program code 370 may use any n-degree polynomial f(x) or any n-degree multi-variable polynomial f(x, y), f(x, y, z), etc.

Verification component 330 can then perform any suitable mathematical calculations to find a scaling relation or any other suitable mathematical relation between the unmodified polynomial and the modified polynomial. In some examples, the modified polynomial can overlap with the unmodified polynomial for all inputs (e.g., the set of integers N as used in the examples above, the set of real numbers $\mathbb{R}$, the set of integers Z, the set of complex numbers C etc.). In some examples, the modified polynomial can overlap with the unmodified polynomial for a specific set of numbers, such as integers in a given range of values.

Figure 3D:
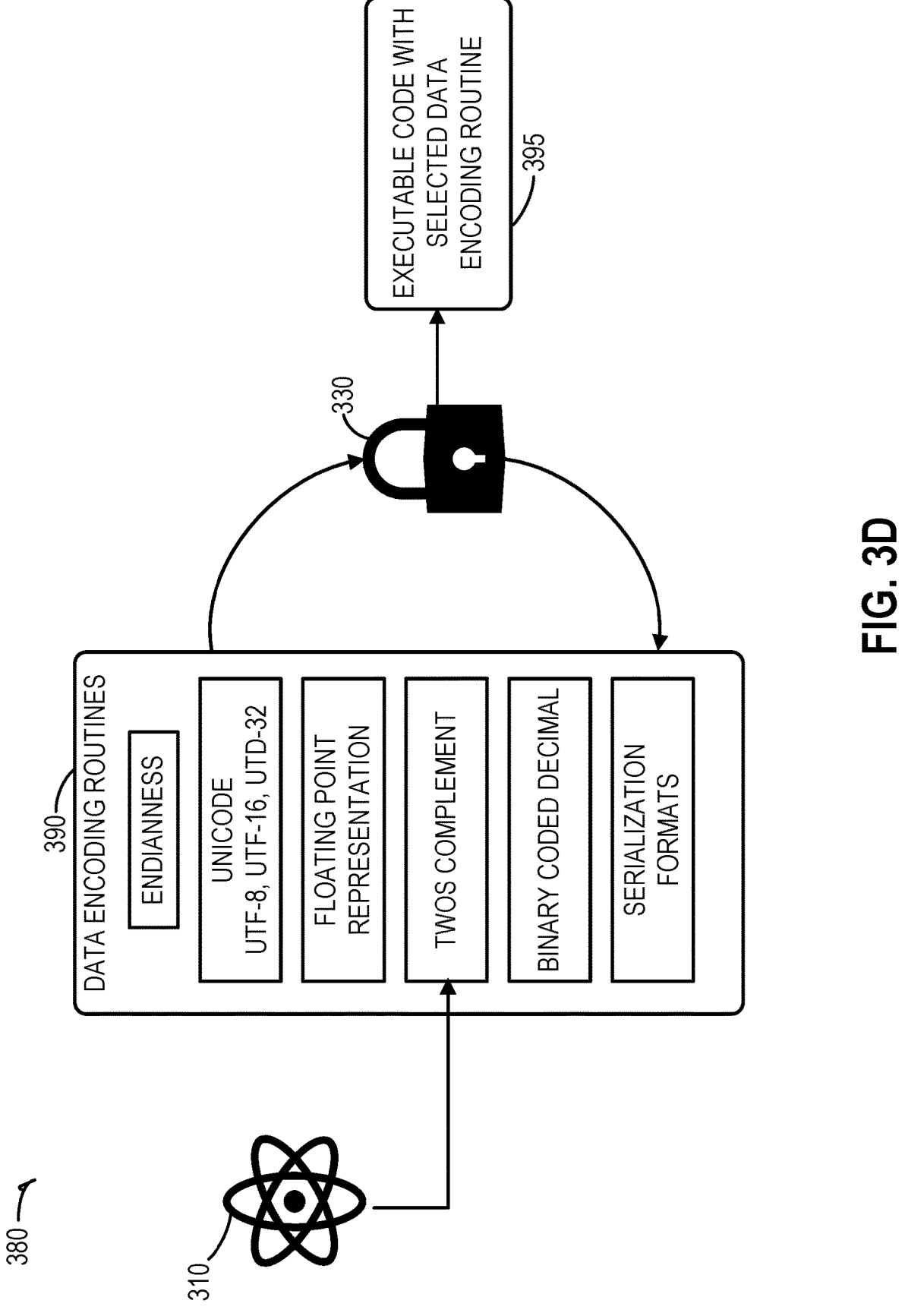
FIG. 3D illustrates modification of a data encoding routine using a in accordance with some examples.

FIG. 3D illustrates modification of a data encoding routine using a random number generated from a quantum derived seed in accordance with some examples. As shown, block diagram 380 includes the random number 310, data encoding routines 390, verification component 330, and executable code 395.

In some examples, the random number 310 may be used to select one option of a list of options for data routines, such as from the list of endianness, Unicode encoding, floating point representation, twos complement, binary coded decimal, or serialization format.

In the example shown in FIG. 3D, twos complement is randomly selected. A second random number (e.g., also generated using a quantum derived seed) may then be used to determine a type of twos complement (e.g., either using or not using the twos complement representation). In an example where the random number selects the Unicode encoding from the list, then a second random number may be used to further select a type of Unicode encoding from available options (e.g., UTF-8, UTF-16, UTF-32).

Verification component 330 may be used to perform the randomly selected data encoding. Verification component 330 may also be used to ensure that the type of encoding selected is compatible with any data already present in the program code. Verification component 330 may be used to check data encoding compatibility with any suitable subprocesses of program code that may be executed at a later time after the data encoding.

FIG. 4A illustrates a flowchart showing a technique 400 for modified quantum entangled bit communication in accordance with some examples. In an example, operations of the technique 400 may be performed by processing circuitry, for example by executing instructions stored in memory. The processing circuitry may include a processor, a system on a chip, or other circuitry (e.g., wiring). For example, technique 400 may be performed by processing circuitry of a device (or one or more hardware or software components thereof), such as those illustrated and described with reference to FIG. 1 (e.g., the processors 125, 145 of FIG. 1) or 6.

The technique 400 includes an operation 402 to generate, at a first node in a computing network, a random number using a quantum derived seed as input to a random number generator. The quantum derived seed may include any type of quantum system that produces entanglement between two entities in the quantum system, and that may transport at least one of the two entangled entities between nodes in a computing network.

The random number generator may produce the random number based on measurements of the quantum derived seed comprising quantum entangled particles, wherein the first node measures a first particle in a pair of quantum entangled particles and wherein the second node measures a second particle in the pair of quantum entangled particles. such as those illustrated and described with reference to FIGS. 1 and 2. In some examples, by using a pair of entangled particles, a measurement of the first particle at the first node may produce the same random number as a separate measurement of the second particle at the second node. This may provide a device for secure communication of random numbers to different nodes in the computing network.

Each node in the computing network may have any suitable hardware to perform the measurement that generates the random number. Each measurement of a quantum entangled particle may produce a random number using any suitable process to quantify the measurement into the random number. In some examples, a stream or multiple instances of a pair of entangled particles may be used to generate the random number with a desired bit length.

The technique 400 includes an operation 404 modify, at the first node, a program using the random number while maintaining a functional output of the program for a given input. The program modified at operation 404 may comprise at least one cryptographic algorithm, and modifying the program may comprise modifying at least one of a key generation process, an encryption process, or a decryption process involved in the at least one cryptographic algorithm. The program modified at operation 404 may comprise altering control flow within the program. For example, the program may include at least one conditional branch, and modifying the program may comprise determining (using the random number) an execution path of the at least one conditional branch. In this example, each conditional branch may be designed to perform equivalent operations to every other branch and may include performing the operations in a different sequence and with additional operations. Alternate routes through such conditional branches may be designed to produce a functionally equivalent output, as discussed further with reference to operations 452-456 of technique 450.

The program modified at operation 404 may comprise at least one constant value that is used when executing the program, and modifying the program may comprise modifying the at least one constant. For example, the program modified at operation 404 may include a mathematical function having several parameters. In this example, modifying the program at operation 404 may comprise modifying at least one parameter in the mathematical function, resulting in a modified mathematical function. Continuing this example, the modified mathematical function may produce computationally equivalent outputs to the mathematical function prior to the modification at operation 404, as will be discussed further with reference to operations 452-456 of technique 450.

In another example of a program that uses at least one constant value, the program modified at operation 404 may include a timing value in a time-sensitive algorithm and modifying the program may include modifying the timing behavior of the time-sensitive algorithm. Alternatively, the program modified at operation 404 may comprise a data encoding routing and modifying the program may comprise selecting an encoding scheme from a list of available encoding schemes.

The technique 400 includes an operation 406 to receive, at the first node from a second node, an input to the program, the input based on the random number. As noted above with reference to operation 402, each of the first node and the second node may generate the same random number through measuring quantum entangled particles locally at each node.

The technique 400 includes an operation 408 to execute the modified program at the first node using the input to obtain an output consistent with the program in an unmodified state.

FIG. 4B illustrates a flowchart showing a technique 450 for use in verifying a modified program that is used in modified quantum entangled bit communication in accordance with some examples. In an example, operations of the technique 450 may be performed by processing circuitry, for example by executing instructions stored in memory. The processing circuitry may include a processor, a system on a chip, or other circuitry (e.g., wiring). For example, technique 450 may be performed by processing circuitry of a device (or one or more hardware or software components thereof), such as those illustrated and described with reference to FIG. 1 (e.g., the processors 125, 145 of FIG. 1) or 6.

In some examples, technique 450 can be executed as a sub-routine of any other suitable technique. For example, technique 450 can be executed after operation 404 of technique 400 and prior to execution of operation 406 of technique 400. Technique 450 can additionally receive or access any suitable inputs related to technique 400, such as a version of the program prior to modification at operation 404 in addition to the modified program as modified at operation 404.

The technique 450 includes an operation 452 to execute, at the first node, the modified program from operation 404 of FIG. 4A with a set of predefined input values. The set of predefined input values used at operation 452 may be any suitable set of values and may be stored within the computing node. The set of predefined input values may also include a corresponding set of output values that may be used to validate the output of a program modified at operation 404.

The technique 450 includes an operation 454 to compare, at the first node, a set of outputs of the modified program to a corresponding set of output values. The corresponding set of output values may be generated by inputting the set of predefined input values used at operation 452 to the program during execution of technique 400, that is, prior to operation 404 where the program is modified. The predefined input values and corresponding set of output values may be generated and stored at any node in the computing network and may be updated with any suitable frequency. The first node in the computing network may retrieve the predefined input values and corresponding set of output values from an internal memory or from another node in the computing network. In some examples, the operation at 454 may include using a checksum, a hash function, and any other suitable verification process or combination thereof to compare the set of outputs of the modified program to the corresponding set of output values from the unmodified program.

The technique 450 includes an operation 456 to determine, at the first node, based on comparing the set of outputs of the program to the corresponding set of output values, that the modified program maintains the functional output of the program.

Figure 5A:
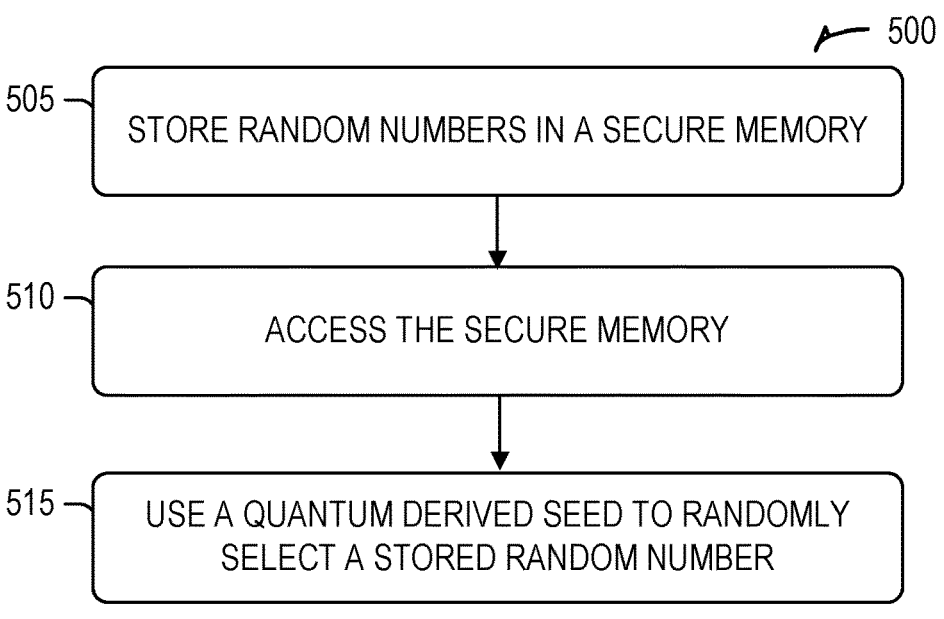
FIG. 5A illustrates a flowchart showing a technique for storing random numbers produced by a quantum-derived seed input to a random number generation in accordance with some examples.

FIG. 5A illustrates a flowchart showing a technique 500 for storing random numbers generated from a quantum derived seed and for use with any suitable additional techniques such as technique 400 as described above with reference to FIG. 4A.

The technique 500 includes an operation 505 to store random numbers in a secure memory. In an example, the random numbers may be generated using any suitable random number generation system. In an example, the secure memory may be any suitable location in a computing network, such as a computing node. In an example, the secure memory may be accessed by any suitable node of the computing network, such as a node that is executing operations such as those described above with reference to technique 400.

The technique 500 includes an operation 510 to access the secure memory. The technique 500 includes an operation 515 to use a quantum derived seed to create a second random number that is used to randomly select a stored random number. In an example, a random number selected at operation 515 may be used in connection with any suitable additional techniques. For example, the random number selected at operation 515 may be used in operation 402, operation 406, or both, of technique 400 as described above.

Figure 5B:
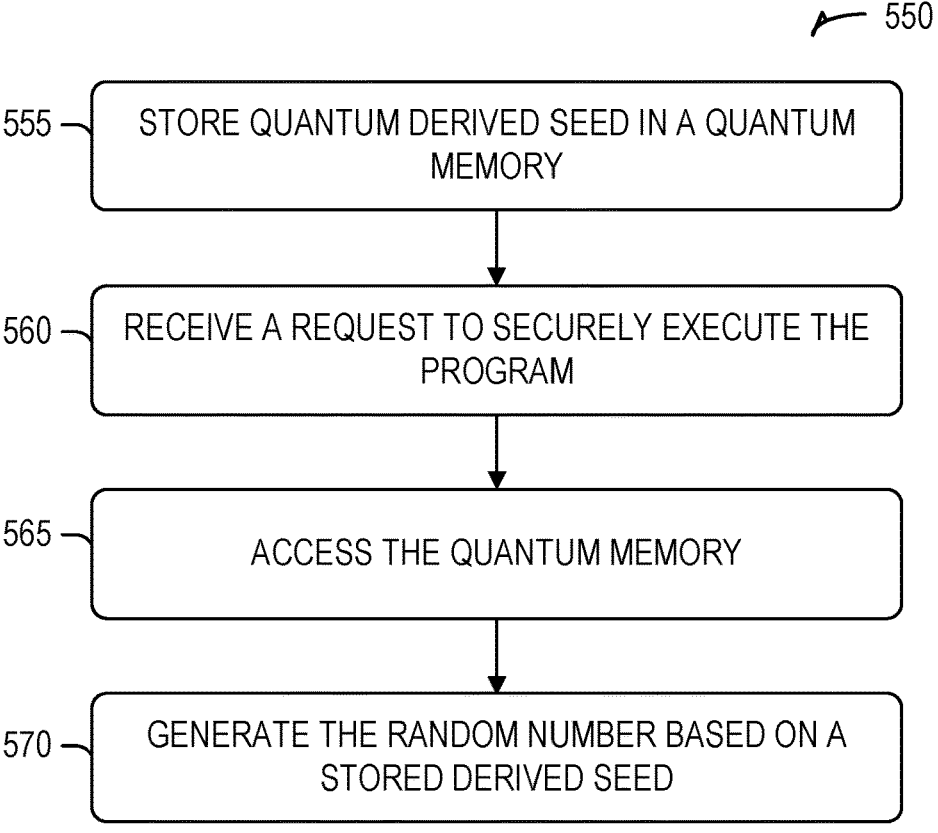
FIG. 5B illustrates a flowchart showing a technique for storing quantum entangled particles that are used to generate a random number at a later time in accordance with some examples.

FIG. 5B illustrates a flowchart showing another technique 550 for storing random numbers, in particular, for storing a quantum derived seed (e.g., quantum entangled particles) that may be used to generate a random number. In an example, technique 550 may be used with any suitable additional techniques such as technique 400 as described above with reference to FIG. 4A.

The technique 550 includes an operation 555 to store a quantum derived seed in a quantum memory. In an example, a quantum memory may store any suitable quantity of individual quantum bits or pairs of bits that are already entangled. A quantum memory may store photon polarization, electron spin, atomic energy levels, or any other quantum property that may exist in superposition. The quantum memory storage units may be comprised of any suitable physical storage medium, such as trapped ions, quantum dots, rare-earth-ion-doped crystals, nitrogen-vacancy (or any other suitable 'color center') in a diamond, silicon carbide, or other suitable crystalline lattice. Any suitable hardware may be included in the quantum memory in order to initiate storage of quantum information in the physical storage medium, such as may be necessary to create ion traps, laser pulses, RF pulses, etc. Any suitable additional hardware may be included in the quantum memory that can preserve the coherence of the stored quantum information (e.g., qubit) or entangled qubits. Preserving the coherence of the stored information can be accomplished through isolating the physical storage medium from environmental factors. Examples of such hardware include cryogenic refrigerators, vacuum chambers, magnetic fields, electric fields, optical traps, laser cooling, specific material and design (e.g., circuit design) choices made when fabricating the physical storage medium, or any suitable combination thereof. The quantum memory can have any suitable coherence time, where accessing a particular qubit within the coherence time of the quantum memory can allow the quantum information stored in that particular qubit to be read-out into another medium, such as a photon.

In an example, the quantum memory may be linked to or accessible by any suitable nodes within a computing network.

The technique 550 includes an operation 560 to receive a request for a securely generated random number. In an example, the request may include any suitable information, such as a request to securely execute a program using a technique requiring a securely generated random number, as described in technique 400. In an example, the request may be received at a computing device used to operate the quantum memory. In some examples, the operation 560 can include a timeout indicator which can indicate that the operation 560 has been received after a suitable coherence time of the quantum memory. That is, the operation 560 can return a timeout message to any suitable entity that transmitted the request for a securely generated random number. This may happen when operation 560 occurs after too much time has passed since initializing the storage of quantum information in the quantum memory.

When the request at operation 560 is received or processed within a coherence time of the quantum memory, the technique 550 can proceed to operation 565 and can access the quantum memory. Accessing the quantum memory can include measuring the quantum derived seed, such as measuring the state of a quantum superposition of a single qubit, a pair of entangled qubits, etc. In some examples, measurement (or read-out) of quantum information stored in the quantum memory can use substantially the same hardware as was used to initialize the information at operation 555, such as using a laser pulse to create a fluorescence signal in the physical storage medium where an intensity of the fluorescence signal can allow for determination of the stored quantum information.

For example, operation 565 may transfer entanglement from a pair of quantum entangled particles (e.g., nuclear spins in a crystal lattice) stored in the quantum memory to a different pair of particles (e.g., photon pair) that may be transmitted to a first node and a second node in the computing network.

The technique 550 includes an operation 570 to generate the random number based on the quantum derived seed (e.g., the stored pair of quantum entangled particles). In an example, operation 570 may generate the random number by measuring one of the stored pair of quantum entangled particles. For example, operation 570 may measure the pair of entangled particles in the quantum memory at a computing device associated with the quantum memory. In an example, operation 570 may include sending a pair of entangled particles generated at operation 565 (e.g., by transferring stored entanglement to photon pairs) to a first node and a second node in the computing network. Continuing this example, operation 570 may include distinct measurements of the transmitted pair of entangled particles at each of the first node and second node in the computing network, similar to operation 402 as described above with reference to technique 400.

In an example, operations of the technique 500 or 550 may be performed by processing circuitry, for example by executing instructions stored in memory. The processing circuitry may include a processor, a system on a chip, or other circuitry (e.g., wiring). For example, technique 500 or 550 may be performed by processing circuitry of a device (or one or more hardware or software components thereof), such as those illustrated and described with reference to FIG. 1 (e.g., the processors 125 and 145) or 6.

Figure 6:
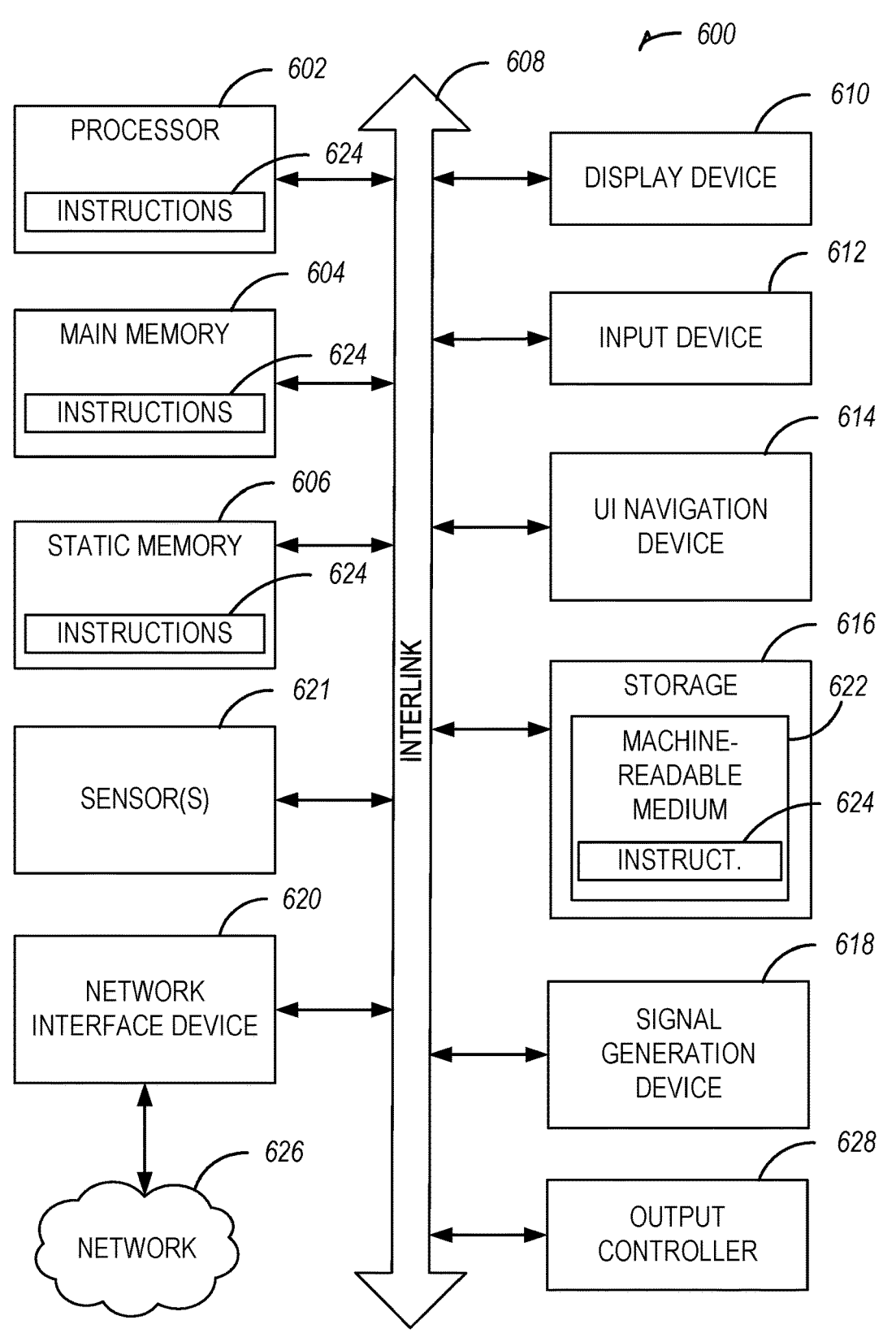
FIG. 6 illustrates generally an example of a block diagram of a machine upon which any one or more of the techniques discussed herein may perform in accordance with some examples.

FIG. 6 illustrates generally an example of a block diagram of a machine 600 upon which any one or more of the techniques (e.g., methodologies) discussed herein may perform in accordance with some examples. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, alphanumeric input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 that is non-transitory on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

The following, non-limiting examples, detail certain aspects of the present subject matter to solve the challenges and provide the benefits discussed herein, among others.

Example 1 is a method comprising: generating, at a first node in a computing network, a random number using a quantum derived seed as input to a random number generator; modifying, at the first node, a program using the random number while maintaining a functional output of the program for a given input; receiving, at the first node from a second node, an input, the input based on the random number; and executing the modified program at the first node using the input to obtain an output consistent with the program in an unmodified state.

In Example 2, the subject matter of Example 1 includes, wherein the program comprises at least one cryptographic algorithm, and modifying the program comprises modifying at least one of a key generation process, an encryption process, or a decryption process.

In Example 3, the subject matter of Examples 1-2 includes, wherein the program includes at least one conditional branch, and modifying the program comprises determining an execution path of the at least one conditional branch, wherein the at least one conditional branch is designed such that each branch performs equivalent operations in a different sequence.

In Example 4, the subject matter of Examples 1-3 includes, wherein the program includes at least one constant used when executing the program, and modifying the program comprises modifying the at least one constant.

In Example 5, the subject matter of Example 4 includes, wherein the at least one constant is a parameter in a mathematical function, and modifying the program comprises modifying the parameter, wherein using the modified parameter in the mathematical function results in a modified mathematical function that is computationally equivalent to the mathematical function prior to modifying the program.

In Example 6, the subject matter of Examples 4-5 includes, wherein the at least one constant is a timing value in a time-sensitive algorithm, and modifying the program comprises modifying a timing behavior of the time-sensitive algorithm.

In Example 7, the subject matter of Examples 1-6 includes, wherein the program comprises a data encoding routine and modifying the program comprises selecting an encoding scheme from a plurality of encoding schemes.

In Example 8, the subject matter of Examples 1-7 includes, wherein modifying the program further comprises: executing the modified program with a set of predefined input values; comparing a set of outputs of the modified program to a corresponding set of output values, wherein the corresponding set of output values is generated using the set of predefined input values with the program prior to modifying the program; and determining, based on comparing the set of outputs of the program to the corresponding set of output values, that the modified program maintains the functional output of the program.

In Example 9, the subject matter of Example 8 includes, wherein comparing the set of outputs of the modified program to the corresponding set of output values further comprises using a checksum or a hash function.

In Example 10, the subject matter of Examples 1-9 includes, wherein the random number generator produces the random number based on measurements of the quantum derived seed comprising quantum entangled particles, wherein the first node measures a first particle in a pair of quantum entangled particles and wherein the second node measures a second particle in the pair of quantum entangled particles.

In Example 11, the subject matter of Examples 1-10 includes, wherein the random number generator produces a set of random numbers, and the set of random numbers are stored in a secure memory, and wherein modifying the program using the random number further comprises: accessing the secure memory; and using a second quantum derived seed as input to the random number generator to randomly select one of the set of random numbers stored in the secure memory.

In Example 12, the subject matter of Examples 1-11 includes, wherein the random number generator stores the quantum derived seed in a quantum memory prior to measuring the quantum derived seed, and wherein the method further comprises: receiving a request to securely execute the program; accessing the quantum memory; and generating the random number based on the stored quantum derived seed.

In Example 13, the subject matter of Examples 10-12 includes, wherein the measurements of the quantum derived seed comprising quantum entangled particles comprise measuring a spin state for each electron in a stream of entangled electron pairs, wherein each measurement provides a corresponding bit value of the random number.

In Example 14, the subject matter of Examples 10-13 includes, wherein the measurements of the quantum derived seed comprising quantum entangled particles comprise detecting a path of single photons sent through a beam splitter having two output paths, wherein detecting a first single photon at a first output path of the beam splitter provides a first bit value of the random number, wherein detecting a second single photon at a second output path of the beam splitter provides a second bit value of the random number, the first bit value being different than the second bit value.

In Example 15, the subject matter of Examples 10-14 includes, wherein the measurements of the quantum derived seed comprising quantum entangled particles comprise measuring a polarization state for each photon in a stream of entangled photon pairs, wherein each measurement provides a corresponding bit value for the random number.

In Example 16, the subject matter of Examples 10-15 includes, wherein the measurements of the quantum derived seed comprising quantum entangled particles comprise recording a series of arrival times of a stream of photons at a detector, wherein a difference or variation in arrival time between subsequent single photons provides a bit value for the random number.

In Example 17, the subject matter of Examples 10-16 includes, wherein the measurements of the quantum derived seed comprising quantum entangled particles comprise measuring decay times of a radioactive isotope, wherein a difference or variation in decay time between successive decay events of the radioactive isotope provides a bit value for the random number.

In Example 18, the subject matter of Examples 10-17 includes, wherein the quantum entangled particles comprise a pair of entangled qubits and the measurements of the quantum derived seed comprising quantum entangled particles comprise measuring a phase of a one qubit of the pair of entangled qubits at different evolution times, wherein an output of measuring the phase is quantified to provide a bit value for the random number.

Example 19 is at least one machine-readable medium including instructions that, when executed by processing circuitry, cause the processing circuitry to perform operations to implement of any of Examples 1-18.

Example 20 is an apparatus comprising means to implement of any of Examples 1-18.

Example 21 is a system to implement of any of Examples 1-18.

Example 22 is a method to implement of any of Examples 1-18.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method comprising:
    generating, at a first node in a computing network, a random number using a quantum derived seed as input to a random number generator;
    modifying, at the first node, a program using the random number while maintaining a functional output of the program for a given input;
    receiving, at the first node from a second node of the computing network, an input, the input based on the random number; and
    executing the modified program at the first node using the input to obtain an output consistent with the program in an unmodified state.

2. The method of claim 1, wherein the program comprises at least one cryptographic algorithm, and wherein modifying the program comprises modifying at least one of a key generation process, an encryption process, or a decryption process.

3. The method of claim 1, wherein the program includes at least one conditional branch, and wherein modifying the program comprises determining an execution path of the at least one conditional branch, wherein the at least one conditional branch is designed such that each branch performs equivalent operations in a different sequence.

4. The method of claim 1, wherein the program includes at least one constant used when executing the program, and wherein modifying the program comprises modifying the at least one constant.

5. The method of claim 4, wherein the at least one constant is a parameter in a mathematical function, and wherein modifying the program comprises modifying the parameter, wherein using the modified parameter in the mathematical function results in a modified mathematical function that is computationally equivalent to the mathematical function prior to modifying the program.

6. The method of claim 4, wherein the at least one constant is a timing value in a time-sensitive algorithm, and wherein modifying the program comprises modifying a timing behavior of the time-sensitive algorithm.

7. The method of claim 1, wherein the program comprises a data encoding routine and wherein modifying the program comprises selecting an encoding scheme from a plurality of encoding schemes.

8. The method of claim 1, wherein modifying the program includes:
    executing the modified program with a set of predefined input values;
    comparing a set of outputs of the modified program to a corresponding set of output values, wherein the corresponding set of output values is generated using the set of predefined input values with the program prior to modifying the program; and
    determining, based on comparing the set of outputs of the program to the corresponding set of output values, that the modified program maintains the functional output of the program.

9. The method of claim 8, wherein comparing the set of outputs of the modified program to the corresponding set of output values includes using a checksum or a hash function.

10. The method of claim 1, wherein the random number generator produces the random number based on measurements of the quantum derived seed comprising quantum entangled particles, and wherein the first node measures a first particle in a pair of quantum entangled particles and wherein the second node measures a second particle in the pair of quantum entangled particles.

11. The method of claim 10, wherein the measurements of the quantum derived seed comprising quantum entangled particles comprise measuring a spin state for each electron in a stream of entangled electron pairs, and wherein each measurement provides a corresponding bit value of the random number.

12. The method of claim 10, wherein the measurements of the quantum derived seed comprising quantum entangled particles comprise detecting a path of single photons sent through a beam splitter having two output paths, wherein detecting a first single photon at a first output path of the beam splitter provides a first bit value of the random number, and wherein detecting a second single photon at a second output path of the beam splitter provides a second bit value of the random number, the first bit value being different than the second bit value.

13. The method of claim 10, wherein the measurements of the quantum derived seed comprising quantum entangled particles comprise measuring a polarization state for each photon in a stream of entangled photon pairs, and wherein each measurement provides a corresponding bit value for the random number.

14. The method of claim 10, wherein the measurements of the quantum derived seed comprising quantum entangled particles comprise recording a series of arrival times of a stream of photons at a detector, and wherein a difference or variation in arrival time between subsequent single photons provides a bit value for the random number.

15. The method of claim 10, wherein the measurements of the quantum derived seed comprising quantum entangled particles comprise measuring decay times of a radioactive isotope, and wherein a difference or variation in decay time between successive decay events of the radioactive isotope provides a bit value for the random number.

16. The method of claim 10, wherein the quantum entangled particles comprise a pair of entangled qubits, wherein the measurements of the quantum derived seed comprising quantum entangled particles comprise measuring a phase of a one qubit of the pair of entangled qubits at different evolution times, and wherein an output of measuring the phase is quantified to provide a bit value for the random number.

17. At least one non-transitory machine-readable medium including instructions, which when executed by processing circuitry of a first node in a computing network, cause the processing circuitry to perform operations to:

generate a random number using a quantum derived seed as input to a random number generator;

modify a program using the random number while maintaining a functional output of the program for a given input;

receive, from a second node of the computing network, an input, the input based on the random number; and execute the modified program using the input to obtain an output consistent with the program in an unmodified state.

18. The at least one non-transitory machine-readable medium of claim 17, wherein the random number includes a set of random numbers stored in a secure memory, and wherein to modify the program using the random number, the operations include operations to:

access the secure memory; and use a second quantum derived seed as input to the random number generator to randomly select one of the set of random numbers stored in the secure memory.

19. A first node in a computing network, the first node comprising:

processing circuitry; and memory, including instructions, which when executed by the processing circuitry, cause the processing circuitry to perform operations to:

generate a random number using a quantum derived seed as input to a random number generator;

modify a program using the random number while maintaining a functional output of the program for a given input;

receive, from a second node of the computing network, an input, the input based on the random number; and execute the modified program using the input to obtain an output consistent with the program in an unmodified state.

20. The first node in the computing network of claim 19, wherein the random number generator outputs the quantum derived seed for storage in a quantum memory prior to measuring the quantum derived seed, and wherein the operations include operations to:

receive a request to securely execute the program;

access the quantum memory; and generate the random number based on the quantum derived seed.

* * * * *